United States Patent
Danilov et al.

(10) Patent No.: US 10,768,840 B2
(45) Date of Patent: Sep. 8, 2020

(54) UPDATING PROTECTION SETS IN A GEOGRAPHICALLY DISTRIBUTED STORAGE ENVIRONMENT

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 39 days.

(21) Appl. No.: 16/240,193

(22) Filed: Jan. 4, 2019

(65) Prior Publication Data

US 2020/0218450 A1  Jul. 9, 2020

(51) Int. Cl.
  *G06F 3/06* (2006.01)
  *G06F 9/30* (2018.01)

(52) U.S. Cl.
  CPC ............ *G06F 3/064* (2013.01); *G06F 3/0604* (2013.01); *G06F 3/067* (2013.01); *G06F 9/30029* (2013.01)

(58) Field of Classification Search
  CPC ........ G06F 3/064; G06F 3/0604; G06F 3/067; G06F 9/30029
  See application file for complete search history.

(56) References Cited

U.S. PATENT DOCUMENTS

| | | |
|---|---|---|
| 5,675,802 A | 10/1997 | Allen et al. |
| 5,805,788 A | 9/1998 | Johnson |
| 7,389,393 B1 | 6/2008 | Karr et al. |
| 8,370,542 B2 | 2/2013 | Lu et al. |
| 8,495,465 B1 | 7/2013 | Anholt et al. |
| 8,832,234 B1 | 9/2014 | Brooker et al. |
| 8,972,478 B1 | 3/2015 | Storer et al. |
| 9,063,838 B1 | 6/2015 | Boyle et al. |
| 9,477,682 B1 | 10/2016 | Bent et al. |

(Continued)

OTHER PUBLICATIONS

Non-Final Office Action received for U.S. Appl. No. 15/794,950 dated Jul. 9, 2019, 29 pages.

(Continued)

*Primary Examiner* — Masud K Khan
(74) *Attorney, Agent, or Firm* — Amin, Turocy & Watson, LLP

(57) ABSTRACT

In one or more embodiments described herein, system, method, and/or computer program products that facilitate updating degraded data protection sets in a geographically distributed storage system. According to an embodiment, a method can comprise receiving, by a system comprising a processor and a memory, a request to update a protection set for a first coded chunk in response to detecting deletion of a primary data chunk, wherein the first coded chunk and the primary data chunk are stored in a geographically distributed data storage system. The method can comprise generating, by the system, a transformation data chunk utilizing a secondary data chunk stored in the geographically distributed data storage system. The method can further comprise generating, by the system, a second coded chunk having an updated protection set, wherein the updated protection set is generated utilizing the transformation data chunk.

20 Claims, 12 Drawing Sheets

(56) References Cited

U.S. PATENT DOCUMENTS

| | | | |
|---|---|---|---|
| 9,641,615 B1* | 5/2017 | Robins | H04L 67/1097 |
| 10,055,145 B1 | 8/2018 | Danilov et al. | |
| 10,361,810 B2 | 7/2019 | Myung et al. | |
| 10,503,611 B1 | 12/2019 | Srivastav et al. | |
| 2002/0166026 A1 | 11/2002 | Ulrich et al. | |
| 2005/0088318 A1 | 4/2005 | Liu et al. | |
| 2005/0140529 A1 | 6/2005 | Choi et al. | |
| 2006/0047896 A1 | 3/2006 | Nguyen et al. | |
| 2006/0075007 A1 | 4/2006 | Anderson et al. | |
| 2006/0143508 A1 | 6/2006 | Mochizuki et al. | |
| 2007/0239759 A1 | 10/2007 | Shen et al. | |
| 2007/0250674 A1 | 10/2007 | Findberg et al. | |
| 2008/0320061 A1 | 12/2008 | Aszmann et al. | |
| 2009/0259882 A1 | 10/2009 | Shellhamer | |
| 2010/0031060 A1 | 2/2010 | Chew et al. | |
| 2010/0218037 A1 | 8/2010 | Swartz et al. | |
| 2010/0332748 A1 | 12/2010 | Van Der Goot et al. | |
| 2011/0138148 A1 | 6/2011 | Friedman et al. | |
| 2011/0196833 A1 | 8/2011 | Drobychev et al. | |
| 2011/0246503 A1 | 10/2011 | Bender et al. | |
| 2012/0023291 A1 | 1/2012 | Zeng et al. | |
| 2012/0191901 A1 | 7/2012 | Norair | |
| 2012/0204077 A1 | 8/2012 | D'Abreu et al. | |
| 2012/0317234 A1 | 12/2012 | Bohrer et al. | |
| 2012/0321052 A1 | 12/2012 | Morrill et al. | |
| 2013/0054822 A1 | 2/2013 | Mordani et al. | |
| 2013/0088501 A1 | 4/2013 | Fell | |
| 2013/0097470 A1 | 4/2013 | Hwang et al. | |
| 2013/0246876 A1 | 9/2013 | Manssour et al. | |
| 2014/0064048 A1 | 3/2014 | Cohen et al. | |
| 2014/0280375 A1 | 9/2014 | Rawson et al. | |
| 2014/0297955 A1 | 10/2014 | Yamazaki et al. | |
| 2014/0380088 A1 | 12/2014 | Bennett et al. | |
| 2014/0380125 A1 | 12/2014 | Calder et al. | |
| 2015/0370656 A1 | 12/2015 | Tsafrir et al. | |
| 2016/0011935 A1 | 1/2016 | Luby | |
| 2016/0011936 A1 | 1/2016 | Luby | |
| 2016/0055054 A1 | 2/2016 | Patterson, III et al. | |
| 2016/0162378 A1 | 6/2016 | Garlapati et al. | |
| 2016/0328295 A1 | 11/2016 | Baptist et al. | |
| 2016/0357649 A1 | 12/2016 | Karrotu et al. | |
| 2016/0371145 A1* | 12/2016 | Akutsu | G06F 11/1076 |
| 2016/0380650 A1 | 12/2016 | Calder et al. | |
| 2017/0003880 A1 | 1/2017 | Fisher et al. | |
| 2017/0097875 A1 | 4/2017 | Jess et al. | |
| 2017/0102993 A1 | 4/2017 | Hu et al. | |
| 2017/0206025 A1 | 7/2017 | Viswanathan | |
| 2017/0206135 A1 | 7/2017 | Zeng | |
| 2017/0262187 A1 | 9/2017 | Manzanares et al. | |
| 2018/0063213 A1 | 3/2018 | Bevilacqua-Linn et al. | |
| 2018/0129417 A1 | 5/2018 | Sivasubramanian et al. | |
| 2018/0181324 A1 | 6/2018 | Daniliv et al. | |
| 2018/0181612 A1 | 6/2018 | Daniliv et al. | |
| 2018/0267856 A1 | 9/2018 | Hayasaka et al. | |
| 2018/0306600 A1 | 10/2018 | Nicolaas et al. | |
| 2018/0341662 A1 | 11/2018 | He | |
| 2019/0028179 A1 | 1/2019 | Kalhan | |
| 2019/0043201 A1 | 2/2019 | Strong et al. | |
| 2019/0043351 A1 | 2/2019 | Yang et al. | |
| 2019/0065310 A1* | 2/2019 | Rozas | H03M 13/3761 |
| 2019/0205437 A1 | 7/2019 | Larson et al. | |
| 2019/0384500 A1 | 12/2019 | Danilov et al. | |
| 2019/0386683 A1 | 12/2019 | Danilov et al. | |

OTHER PUBLICATIONS

Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/651,504 dated Mar. 21, 2019, 10 pages.
Non-Final Office Action received for U.S. Appl. No. 15/662,273 dated Nov. 16, 2018, 19 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Wikipedia, "Standard Raid Levels—Raid 6, URL: https://en.wikipedia.org/wiki/Standard_RAID_levels#RAID_6", Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.

* cited by examiner

UPDATING PROTECTION SETS IN A GEOGRAPHICALLY DISTRIBUTED STORAGE ENVIRONMENT

TECHNICAL FIELD

The subject disclosure relates generally to storage systems. More specifically, this disclosure relates to various embodiments for updating of protection sets in a geographically distributed storage environment.

BACKGROUND

The large increase in amount of data generated by digital systems has created a new set of challenges for data storage environments. Traditional storage area network (SAN) and/or network-attached storage (NAS) architectures have not been designed to support data storage and/or protection at large multi-petabyte capacity levels. Object storage technology can be utilized to meet these requirements. By utilizing object storage technology, organizations can not only keep up with rising capacity levels, but can also store these new capacity levels at a manageable cost point.

Typically, a scale-out, cluster-based, shared-nothing object storage that employs a microservices architecture pattern, for example, an ECS™ (formerly known as Elastic Cloud Storage) can be utilized as a storage environment for a new generation of workloads. ECS™ utilizes the latest trends in software architecture and development to achieve increased availability, capacity use efficiency, and performance. ECS™ uses a specific method for disk capacity management, wherein disk space is partitioned into a set of blocks of fixed size called chunks. User data is stored in these chunks and the chunks are shared. One chunk can comprise fragments of several user objects. Chunk content is modified in an append mode. When chunks become full, they are sealed and the content of sealed chunks is immutable. Oftentimes, chunks can comprise a reduced set of data fragments. This increases capacity overheads on data protection and there are some cases when the overheads may be unreasonably high.

The above-described background relating to ECS™ is merely intended to provide a contextual overview of some current issues, and is not intended to be exhaustive. Other contextual information may become further apparent upon review of the following detailed description.

DETAILED DESCRIPTION

Figure 1:
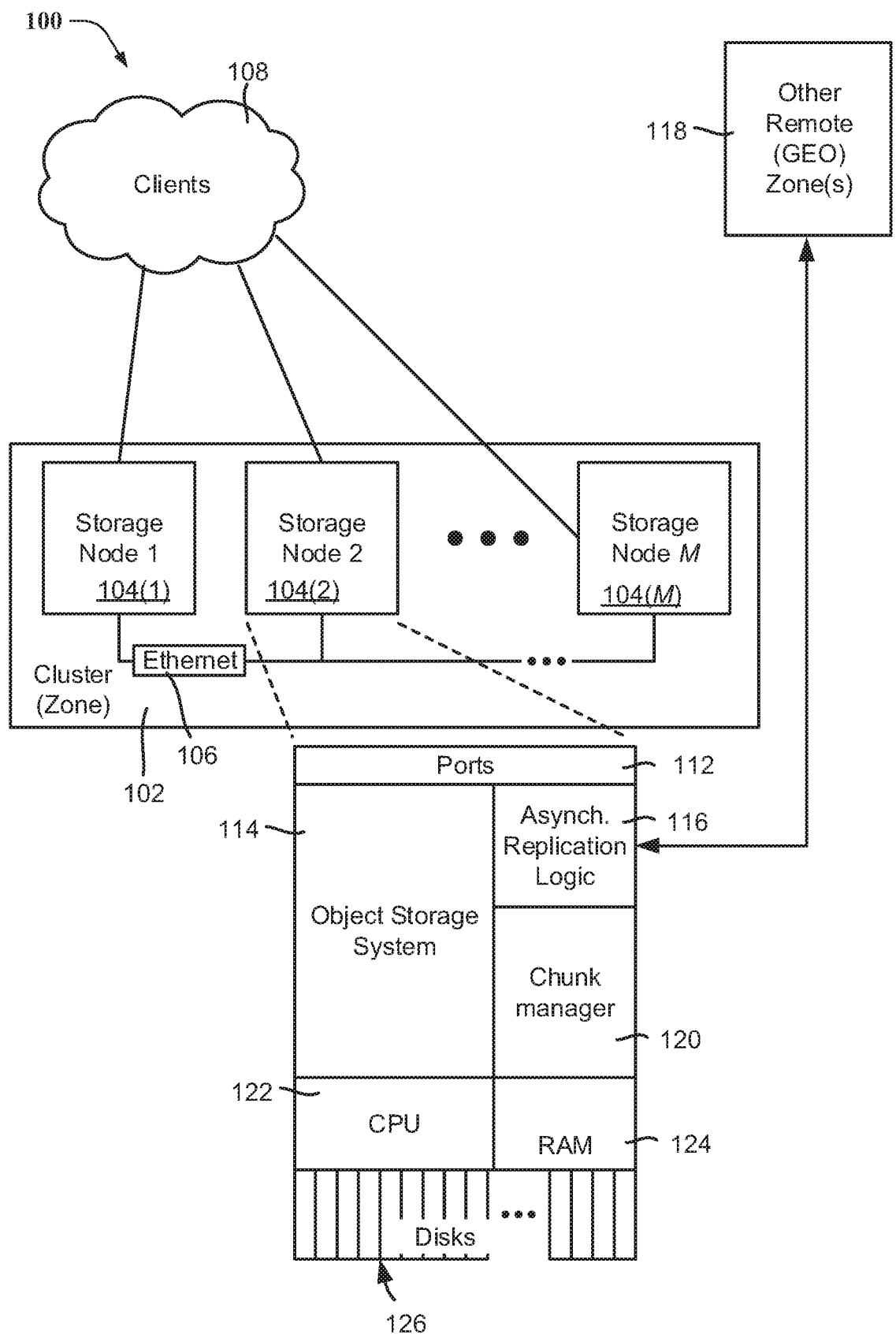
FIG. 1 illustrates an example cloud data storage system comprising that facilitates combining erasure-coded protection sets during meta chunk generation, according to one or more example implementations.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The term "cloud" as used herein can refer to a cluster of nodes (e.g., set of network servers), for example, within a distributed object storage system, that are communicatively and/or operatively coupled to each other, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with each other to provide resources for end-users.

Example systems and methods disclosed herein, in one or more embodiments, relate to cloud storage systems that utilize erasure coding for data protection, such as, but not limited to an ECS™ platform. The ECS™ platform combines the cost advantages of commodity infrastructure with the reliability, availability and serviceability of traditional arrays. ECS™ uses erasure coding approach to protect user data. With erasure coding, a data portion (D) is divided into k fragments. During encoding operation redundant m coding fragments are created. In an aspect, encoding assures that the system can tolerate the loss of any m fragments. In an embodiment, k data fragments and m coding fragments created for a single data portion form a protection set. In one aspect, the ECS™ platform can comprise a cluster of nodes (also referred to as "cluster" herein) that delivers scalable and simple public cloud services with the reliability and/or control of a private-cloud infrastructure. Moreover, the ECS™ platform comprises a scale-out, cluster-based, shared-nothing object storage, which employs a microservices architecture pattern. The ECS™ platform can support storage, manipulation, and/or analysis of unstructured data on a massive scale on commodity hardware. As an example, ECS™ can support mobile, cloud, big data, content-sharing, and/or social networking applications. ECS™ can be deployed as a turnkey storage appliance or as a software product that can be installed on a set of qualified commodity servers and/or disks. The ECS™ scale-out and geo-distributed architecture is a cloud platform that can provide at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In an aspect, ECS™ does not rely on a file system for disk capacity management. Instead, ECS™ partitions disk space into a set of blocks of fixed size called chunks (e.g., having a chunk size of 128 MB). All user data is stored in these chunks and the chunks are shared. Typically, a chunk can comprise fragments of several different user objects. The chunk content can be modified in an append-only mode. When a chunk becomes full, it can be sealed and the content of a sealed chunk is immutable. Further, ECS™ does not employ traditional data protection schemes like mirroring or parity protection. Instead, ECS™ utilizes erasure coding for data protection. A chunk can be divided into indexed portions (e.g., data fragments), for example, by a chunk manager. An index of a data fragment can be a numerical value assigned by the chunk manager and utilized for erasure coding. Moreover, the index of a data fragment can be utilized to determine a coefficient, within an erasure coding matrix (e.g., the index can be utilized to determine a row and/or column of the matrix), which is to be combined (e.g., multiplied) with the data fragment to generate a corresponding coding fragment for the chunk. In an aspect, ECS™ is a cloud storage that supports geographically distributed setups consisting of two or more zones. The corresponding feature is called GEO. GEO can be used to provide an additional protection of user data by means of replication. The replication mechanism works at the chunks level. ECS may use GEO erasure coding technique to minimize capacity overhead associated with GEO data protection. Although the systems and methods disclosed herein have been described with respect to object storage systems (e.g., ECS™), it is noted that the subject specification is not limited to object storage systems and can be utilized for most any storage systems that utilize erasure coding for data protection and chunks for disk capacity management. Thus, any of the embodiments, aspects, concepts, structures, functionalities or examples described herein are non-limiting, and the technology may be used in various ways that provide benefits and advantages in computing and data storage in general.

Oftentimes erasure-coded storage systems create a data protection unit (e.g., meta chunk), which combines two or more source chunks having a reduced sets of data fragments, to increase capacity use efficiency without verification and data copying. However, generation of this data protection unit requires complete data re-protection. In other words, an encoding operation (e.g., erasure coding operation) has to be performed using all/combined data fragments of the meta chunk to generate new coding fragments. This is a very resource-demanding operation, especially for GEO erasure coding. There are situations when a protection set created with GEO erasure coding has fewer than k data chunks. For example, deletion of data chunks leads to a situation when a GEO protection set contains fewer than k data chunks. We call such protection sets degraded. When data is protected with erasure coding, the overheads on data protection may be calculated as m1k. In the situation when there are fewer data chunks (1) the equation to use to calculate the overheads is m1l. The fewer l the greater capacity overheads on data protection and there are cases when the overheads may be unreasonably high. To reduce system capacity overheads on data protection, meta chunks can be used. Meta chunks unite (e.g., sum up) two or more degraded protection sets into a meta protection set and protect data at the meta protection set level. This can create a less degraded protection set or even a protection set of full value with a number of data chunks close to or1 equal to k. In an aspect, a complete re-protection is performed upon creation of meta protection set. The re-protection can be achieved without difficulty when two or more data protection sets complement each other. Their protection sets can be united into a greater protection set via simple summing up operation. It is enough to sum up coding chunks of subsidiary protection sets to get coding chunks of a greater (meta) protection set. In situations where the data protection sets are not complementary, various techniques can be implemented to make a non-complementary protection sets complementary. When converting a non-complementary protection sets complementary, all coding chunks in the connected zones need to be updated. This increases inter-zone network traffic for GEO setups. The systems and methods disclosed herein facilitate a resource-efficient method to update degraded data protection set that reduces inter-zone network traffic in geographically distributed storage systems.

In an embodiment, where there are two zones, of two or more zones system, maintain data protection sets (e.g., a meta coded chunk), at least one zone maintains data protection set (e.g., P chunk) calculated using an XOR (e.g., 'exclusive or' convolution of chunks, hereinafter referenced as XOR, '⊕') operation. In an embodiment, the other zones that maintain the data protection set (e.g., Q chunk), can utilize various techniques, for example, but not limited to a general Galois Field (GF) arithmetic to calculate the data protection set that minimizes storage overhead. The advantage of using an XOR operation is that the chunk's position is not relevant and therefore no requirement to modify the index position to combine (e.g., no need to change non-complementary data protection set to complementary data protection set). Using XOR operation, new chunks can be appended to an existing P chunk and easily extracted from P chunk. In addition, when a data chunk becomes degraded, as discussed above, the P chunk (e.g., formed used the XOR operation) need not require any inter-zone network traffic to be updated, because P chunk formed using an XOR operation does not require an update. In an embodiment, only the Q chunk needs to be updated. Thus, although the degraded chunk was maintained at two zones, only one zone will require an update to the data protection set.

In an exemplary embodiment, a geographically distributed storage environment comprises six zone that store and protect data. In some embodiments, 4 zones comprise data chunks and 2 zones comprise backup in form of coding chunks, one using an XOR operation to generate the coding chunk (chunk P) and one using a standard technique (e.g., GF arithmetic or Geo erasure coding) to generate the coding chunk (chunk Q). When a data chunk is deleted, the protection set becomes degraded (e.g., chunk Q is considered degraded since resource space is allocated for a deleted chunk). In an embodiment, when deletion of data chunk is detected (e.g., a data set is degraded), the system can update the degraded protection set by combining the degraded data protection set with a complementary data protection set. According the embodiment, combination with another complementary data protection set is required only for the chunk Q. For chunk P a XOR operation is performed to remove the empty portion (e.g., space previously occupied by deleted chunk). If the degraded protection set is not complementary, the system can modify the index of one or more chunks to make the degraded data protection set complementary with another data protection set. In an embodiment, a data chunk from any one of the zones comprising a data chunk, a transformation chunk can be created to adjust the index position of the selected data chunk. The transformation chunk can be transformed (e.g., transmitted, inter-zone network transmission, etc.) to zone comprising the chunk Q, wherein the transformation chunk can be combined (e.g., using summing, unite or XOR operation to combine) with the chunk Q to adjust the index position of selected data chunk. Upon generating a data protection set with an updated index position of the selected data chunk, the degraded data protection set is updated. Thus, updating the degraded data protection set via shifting the index and performing an XOR operation, all the degraded protection sets can be re-protected with minimum inter-zone network traffic.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 shows part of a cloud data storage system such as ECS™ comprising a zone (e.g., cluster) 102 of storage nodes 104(1)-104(M), in which each node is typically a server configured primarily to serve objects in response to client requests (e.g., received from clients 108). The nodes 104(1)-104(M) can be coupled to each other via a suitable data communications link comprising interfaces and protocols such as, but not limited to, Ethernet block 106.

Clients 108 can send data system-related requests to the cluster 102, which in general is configured as one large object namespace; there may be on the order of billions of objects maintained in a cluster, for example. To this end, a node such as the node 104(2) generally comprises ports 112 by which clients connect to the cloud storage system. Example ports are provided for requests via various protocols, including but not limited to SMB (server message block), FTP (file transfer protocol), HTTP/HTTPS (hypertext transfer protocol), and NFS (Network File System); further, SSH (secure shell) allows administration-related requests, for example.

Each node, such as the node 104(2), includes an instance of an object storage system 114 and data services. For a cluster that comprises a "GEO" zone of a geographically distributed storage system, at least one node, such as the node 104(2), includes or coupled to reference tracking asynchronous replication logic 116 that synchronizes the cluster/zone 102 with each other remote GEO zone 118.

Note that ECS™ implements asynchronous low-level replication, that is, not object level replication. Typically, organizations protect against outages or information loss by backing-up (e.g., replicating) their data periodically. During backup, one or more duplicate or deduplicated copies of the primary data are created and written to a new disk or to a tape, for example within a different zone. The term "zone" as used herein can refer to one or more clusters that is/are independently operated and/or managed. Different zones can be deployed within the same location (e.g., within the same data center) and/or at different geographical locations (e.g., within different data centers).

In general, and in one or more implementations, e.g., ECS™, disk space is partitioned into a set of large blocks of fixed size called chunks; user data is stored in chunks. Chunks are shared, that is, one chunk may contain segments of multiple user objects; e.g., one chunk may contain mixed segments of some number of (e.g., three) user objects.

A chunk manager 120 can be utilized to manage the chunks and their protection (e.g., via erasure coding (EC)). Erasure coding was created as a forward error correction method for binary erasure channel. However, erasure coding can be used for data protection on data storages. During erasure coding (e.g., utilizing a k+m configuration), the chunk manager 120 can partition a piece of data (e.g., chunk) into k data fragments of equal size. During encoding, redundant m coding fragments are created so that the system can tolerate the loss of any m fragments. Typically, the chunk manager 120 can assign indices to the data fragments (and corresponding coding fragments). In an example, an index can be a numerical value (e.g., 1 to k) that is utilized for erasure coding. Moreover, the index of a data fragment can be utilized to determine a coefficient, within an erasure coding matrix, which is to be combined (e.g., multiplied) with the data fragment to generate a corresponding coding fragment for the chunk. For example, an index value can specify a row and/or column of the coefficient within the erasure coding matrix. As an example, the indices can be assigned based on a defined sequence, in a random order, based on a defined criterion (e.g., to increase probability of complementary data fragments), based on operator preferences, etc. The process of coding fragments creation is called encoding. The process of data fragments recovery using available data and coding fragments is called decoding.

In one example embodiment, GEO erasure coding can also be utilized, wherein if a distributed storage 100 is to tolerate the loss of any m zones/clusters/chunks, then GEO erasure coding can begin at each zone by replicating each new chunk to at least m remote zones. As a result, there are m backup copies of each chunk. Typically, there is one primary backup copy, which can be utilized for encoding. Encoding is performed by one zone for primary backup chunks and other zones replicate to it. Once a zone has k primary chunks replicated from different remote zones, the zone can perform encoding using the chunks replicated to it as data fragments. The chunk size is fixed, in ECS™, with padding or other data to complement, wherein the other data is added as needed. The result of encoding is m data portions of a chunk size. They are stored as chunks of a specific type called coding chunks. After encoding is complete, the zone can store one coding chunk locally and move other m−1 coding chunks to remote zones making sure all the k+m data and coding chunks are stored at different zones whenever possible. Afterwards, the primary backup chunks used for encoding and their peer backup chunks at other zones can be deleted.

In some embodiments, the chunk manager 120 can efficiently generate combined data protection sets during consolidating two or more erasure-coded data portions (e.g., normal/source chunks) that have a reduced sets of data fragments. As an example, chunk manager 120 can verify that the two or more erasure-coded data portions are complementary (e.g., do not have data fragments with the same index) and perform a summing operation to combine their corresponding coding fragments to generate a combined protection set. A CPU 122 and RAM 124 are shown for completeness; note that the RAM 124 can comprise at least some non-volatile RAM. The node includes storage devices such as disks 126, comprising hard disk drives and/or solid-state drives. It is noted that the storage devices can comprise volatile memory(s) or nonvolatile memory(s), or both volatile and nonvolatile memory(s). Examples of suitable types of volatile and non-volatile memory are described below with reference to FIG. 12. The memory (e.g., data stores, databases, tables, etc.) of the subject systems and methods is intended to comprise, without being limited to, these and any other suitable types of memory.

Figure 2:
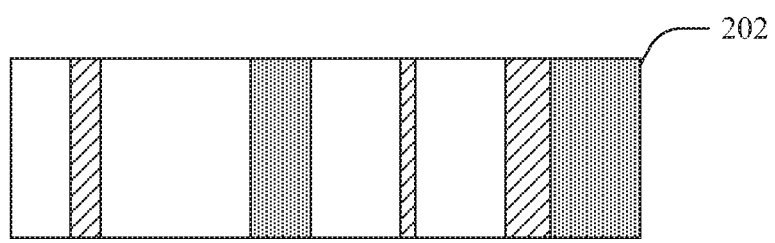
FIG. 2 illustrates an example layout of a chunk within an object storage system in accordance with an aspect of the specification.
Figure 2:
Figure 2:
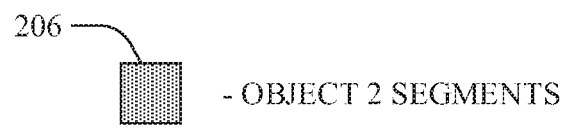
Figure 2:
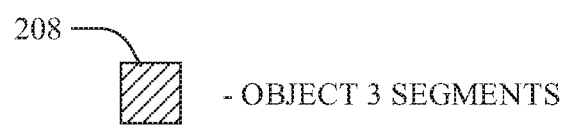

FIG. 2 illustrates an example layout 200 of a chunk within an object storage system in accordance with an aspect of the specification. In an aspect, disk space of the object storage system can be partitioned into a set of blocks of fixed size called chunks. As an example, the chunk size can be 128 MB. Typically, user data is stored in these chunks and the chunks are shared. As shown in FIG. 2, a chunk 202 can comprise segments of several user objects (e.g., object 1 segments 204, object 2 segments 206, and object 3 segments 208). It is noted that the chunk layout depicted in FIG. 2. is one example and the chunks can have most any other layout with segments from one or more user objects. Chunk content is modified in an append-only mode. When the chunk becomes full enough, it is sealed. After the chunk is sealed, its content is immutable.

In an aspect, the chunk can be protected by employing erasure coding. During erasure coding, a chunk can be divided into k data fragments of equal size. To encode the chunk, redundant m coding fragments are created so that the system can tolerate the loss of any m fragments. The process of generating the coding fragments is called encoding. The process of data fragments recovery using available data and coding fragments is called decoding. As an example, the encoding operation can be represented with the equation below:

$$C_i = \sum_{j=1}^{k} C_{i,j} \quad (1)$$

wherein, $$C_{i,j} = X_{i,j} * D_j \quad (2)$$

and wherein, $X_{i,j}$ is a defined coefficient from a coding matrix (e.g., wherein i, j, and/or k can be most any integer). Further, j is an index assigned to the data fragment. It is noted that $D_j$ are independent data fragments and $C_i$ are coding fragments.

Additionally, or optionally, the systems and methods disclosed herein can support geographically distributed set-ups (GEO) comprising two or more zones. GEO can be used to provide an additional protection of user data by means of replication. Replication works at the chunk level, wherein a backup copy of a chunk stored in a primary zone can be replicated to one or more secondary zones. Each zone protects the chunks it stores. If a copy of a chunk becomes unavailable, it can be recovered using its other copy. This process is called GEO recovery. In case of GEO erasure coding, remote backup copies of data chunks are used as data fragments and coding fragments created for such data fragments are stored as coding chunks.

Figure 3:
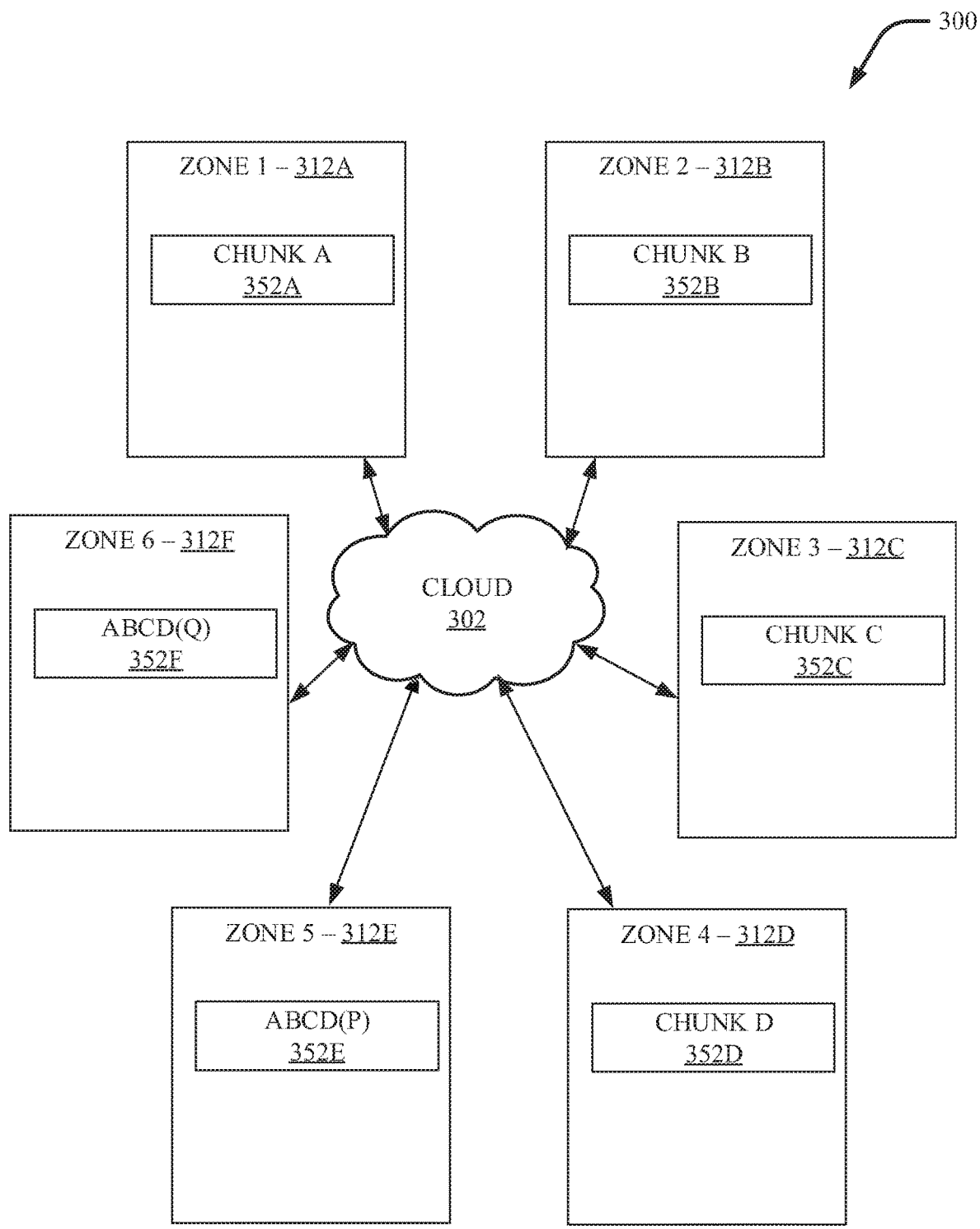
FIG. 3 illustrates an example of a geographically distributed storage system accordance with one or more embodiments described herein.

FIG. 3 illustrates an example of a geographically distributed storage system 300 accordance with one or more embodiments described herein. Repetitive description of like elements employed in respective embodiments is omitted for sake of brevity. According to some embodiments, the geographically distributed storage system 300 can include one or more zones (e.g., six zones) 312a, . . . , 312f interconnected to each other through the cloud 302, wherein zones 312a, . . . , 312d (e.g., zones 1-4) each comprises data chunks 352a, . . . , 352d, respectively, zone 312e (e.g., zone 5) comprise a data protection set (e.g., coding chunk P, 352e) and zone 312f (e.g., zone 6) comprise a data protection set (e.g., coding chunk Q, 352f). In some embodiments, the coding chunk P 352e is calculated using an XOR operation (A⊕B⊕C⊕D=>ABCD) and the coding chunk Q 352f is calculated using a GEO erasure coding method for creating a meta chunk wherein the data chunks 352a, . . . , 352d, are in specific order (e.g., ABCD). In some embodiments, the coding chunk Q 352f is calculated using GF arithmetic.

Figure 4:
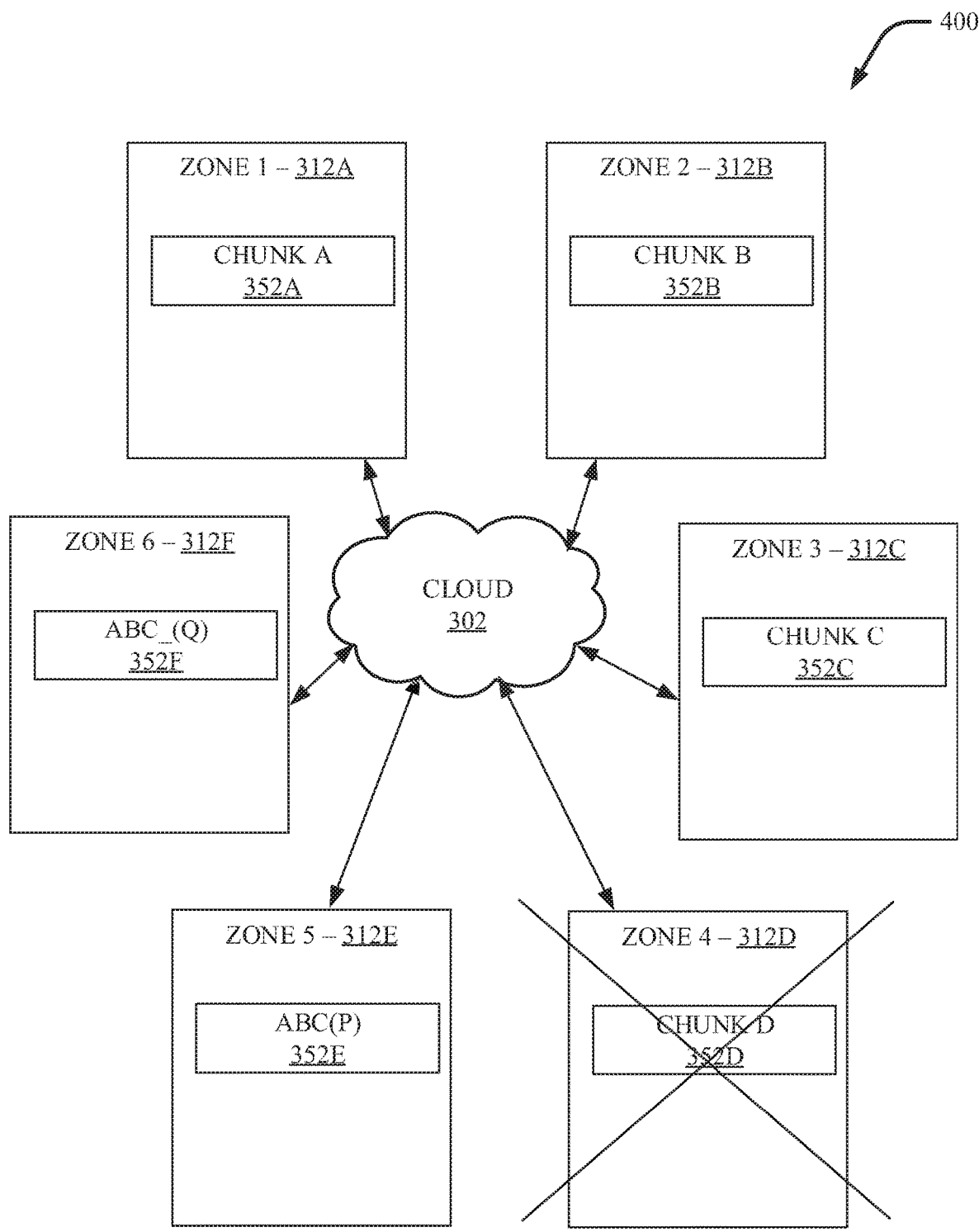
FIG. 4 illustrates an example of a geographically distributed storage system accordance with one or more embodiments described herein.

FIG. 4 illustrates an example of a geographically distributed storage system 400 accordance with one or more embodiments described herein. Repetitive description of like elements employed in respective embodiments is omitted for sake of brevity. According to some embodiments, as it happens often, data chunk D 352d has been deleted from zone 4 312d. The deletion of data chunk D 352d causes zone 6 312f to become degraded since the data chunk D 352d is no longer available for data protection. This is illustrated as coding chunk Q comprising "ABC_", wherein "_" denotes the missing data chunk D 352d. It should be noted that chunk P 352e in not considered degraded because it is merely the XOR of the data chunks (e.g., A⊕B⊕C=>ABC). The overhead has been increased at zone 6 312f since the data protection is contains storage space for a deleted data chunk (e.g., "_"). Thus, a task can be initiated by system to adjust placement of a chunk (e.g., change the index position of C from 3 to 4) in order to re-protect the data protection set.

Figure 5:
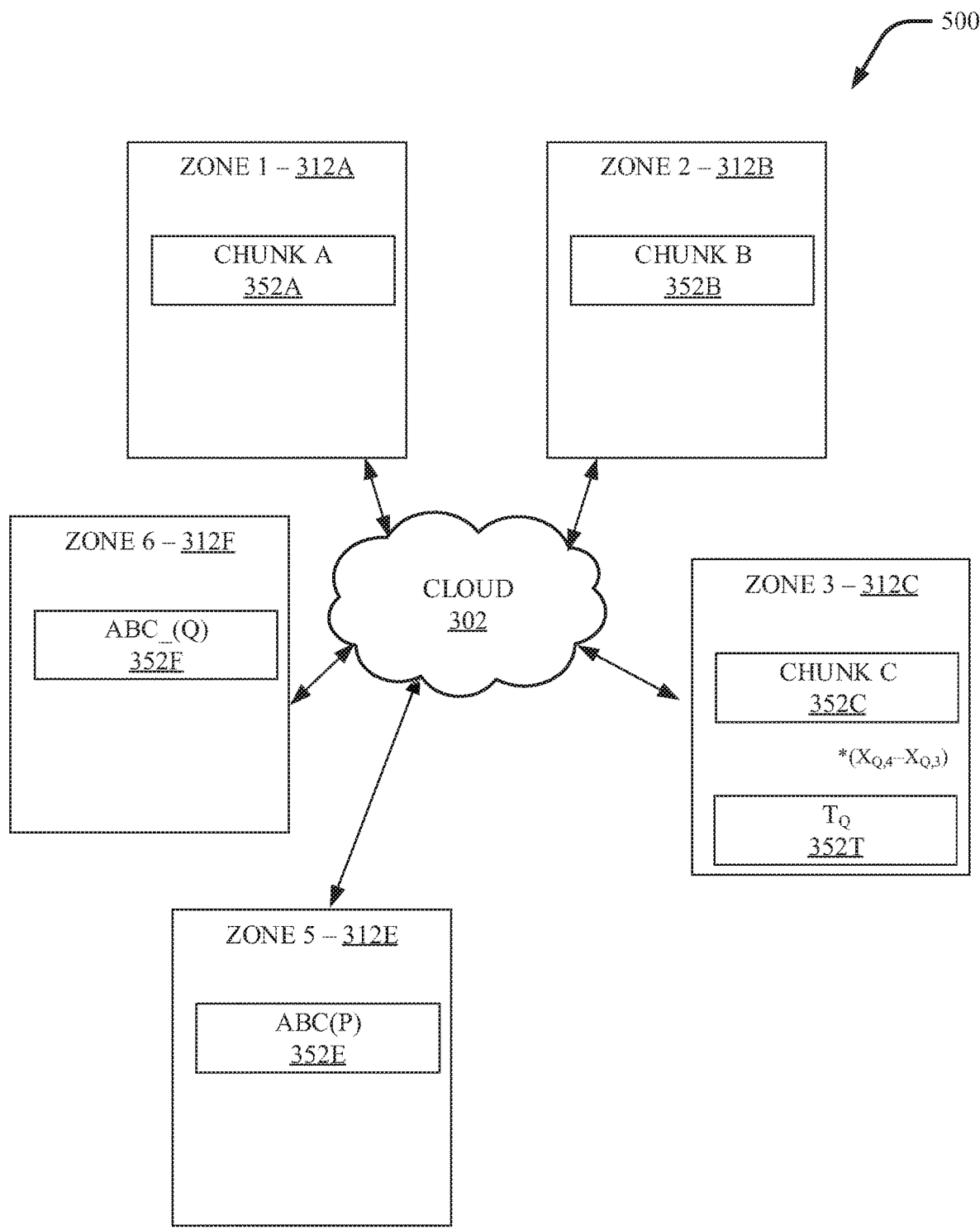
FIG. 5 illustrates an example of a geographically distributed storage system accordance with one or more embodiments described herein.

FIG. 5 illustrates an example of a geographically distributed storage system 500 accordance with one or more embodiments described herein. Repetitive description of like elements employed in respective embodiments is omitted for sake of brevity. According to some embodiments, the system (e.g., the chunk manger 120) can request zone 3 312c comprising chunk C 352c to generate a transformation chunk 352t using chunk C 352c and ($X_{Q,4} - X_{Q,3}$) arithmetic. The transformation chunk T 352t can be used change index position of 'C' (representing chunk C 352c) in the coding chunk Q 352f from $3^{rd}$ position to $4^{th}$.

Figure 6:
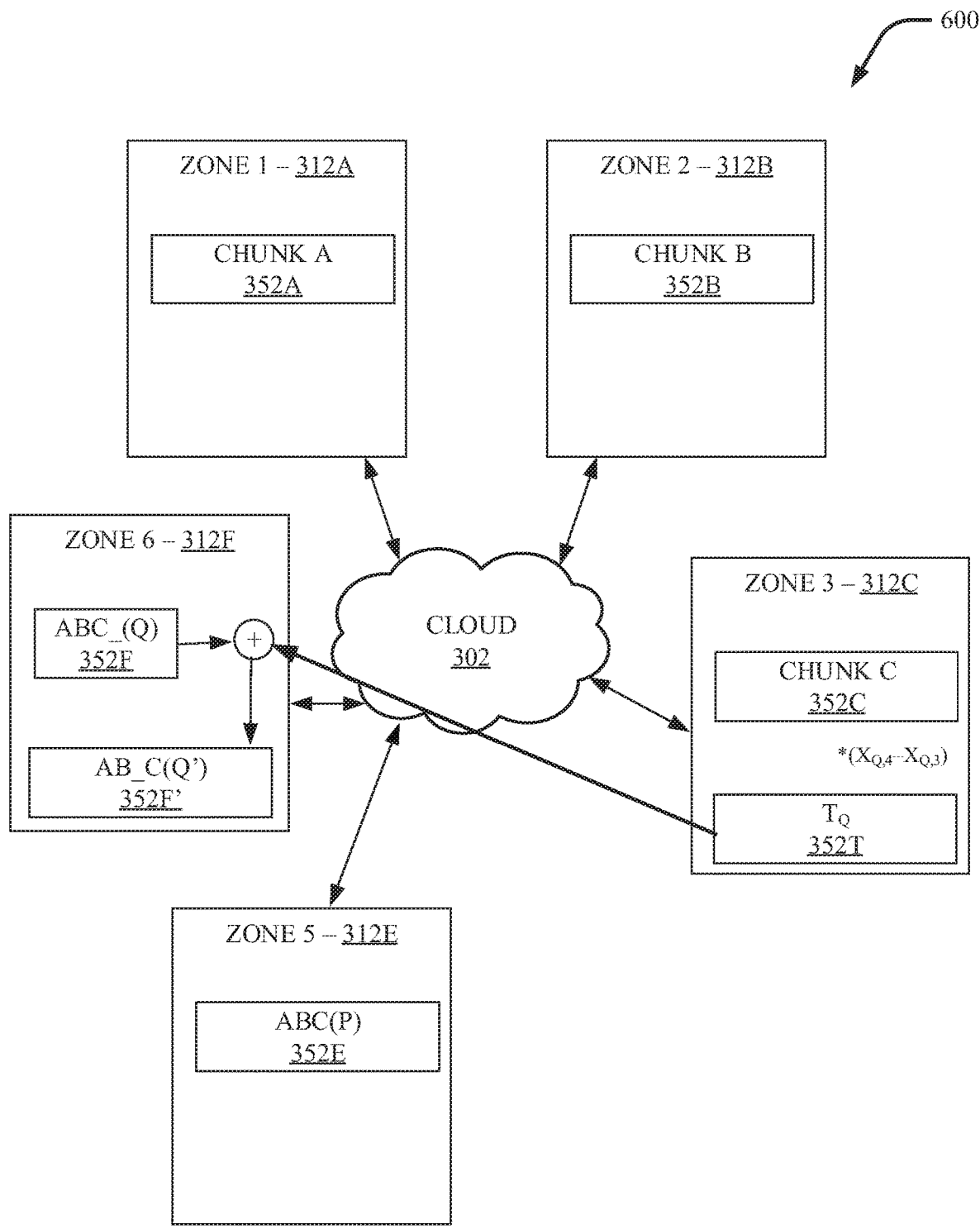
FIG. 6 illustrates an example of a geographically distributed storage system accordance with one or more embodiments described herein.

FIG. 6 illustrates an example of a geographically distributed storage system 600 accordance with one or more embodiments described herein. Repetitive description of like elements employed in respective embodiments is omitted for sake of brevity. According to some embodiments, the transformation chunk T 352t is transmitted to zone 6 312f. Using a standard combining technique, the transformation chunk T 352t is combined with chunk Q 352f to generate a new coding chunk Q' 352f (e.g., AB_C). Upon combining the chunk Q 352f with transformation chunk T 352t, the index position of 'C' is changed from $3^{rd}$ position to $4^{th}$ position in the new data protection set.

Figure 7:
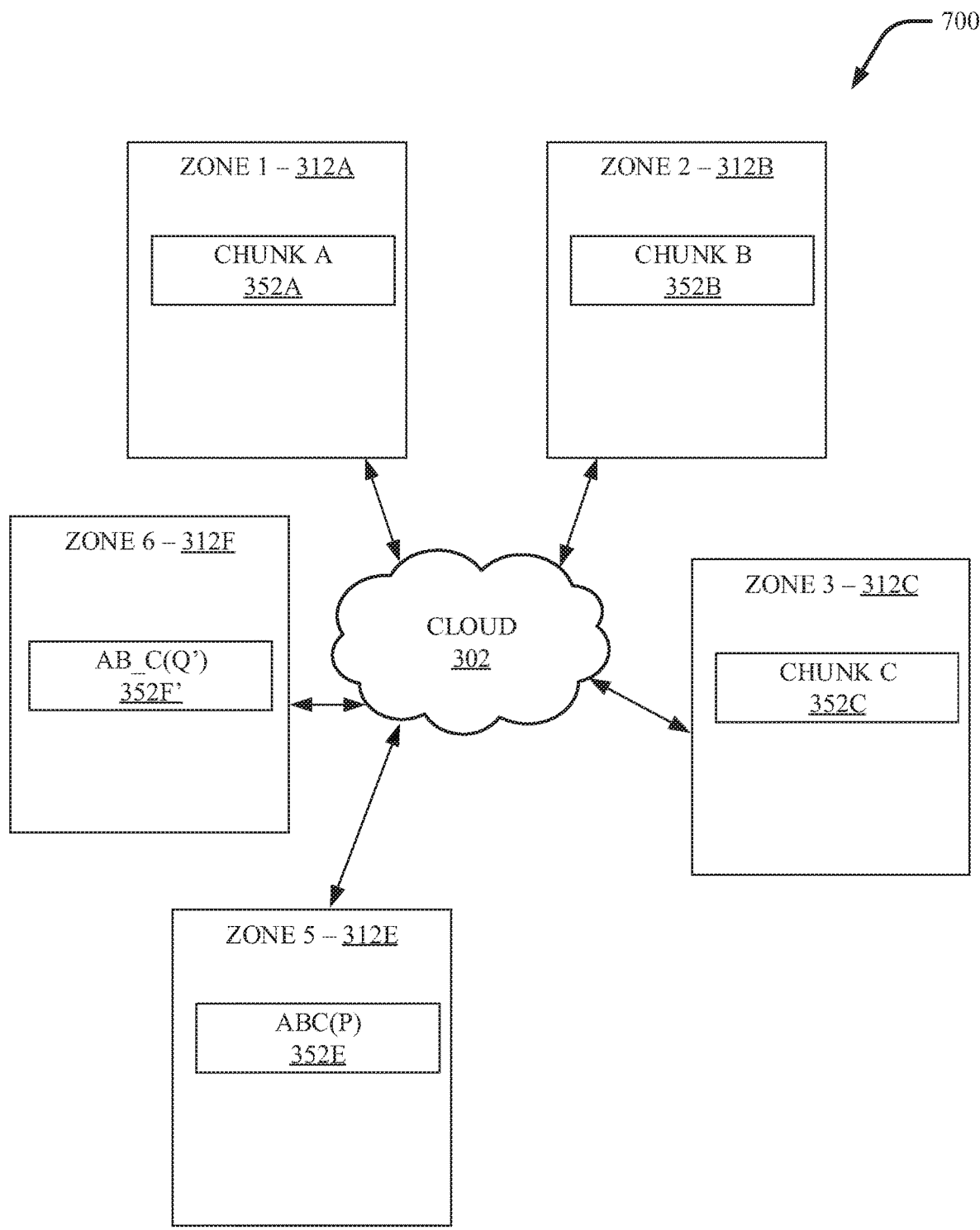
FIG. 7 illustrates an example of a geographically distributed storage system accordance with one or more embodiments described herein

FIG. 7 illustrates an example of a geographically distributed storage system 700 accordance with one or more embodiments described herein. Repetitive description of like elements employed in respective embodiments is omitted for sake of brevity. According to some embodiments, the transformation chunk T 352t is removed from zone 3 312c and the chunk Q 352f is replaced by new coding chunk Q' 352f' (e.g., AB_C). It should be noted that only one interzone network transmission occurred for updating the chunk Q 352f and no transmission was required to update chunk P 352e.

Figure 8:
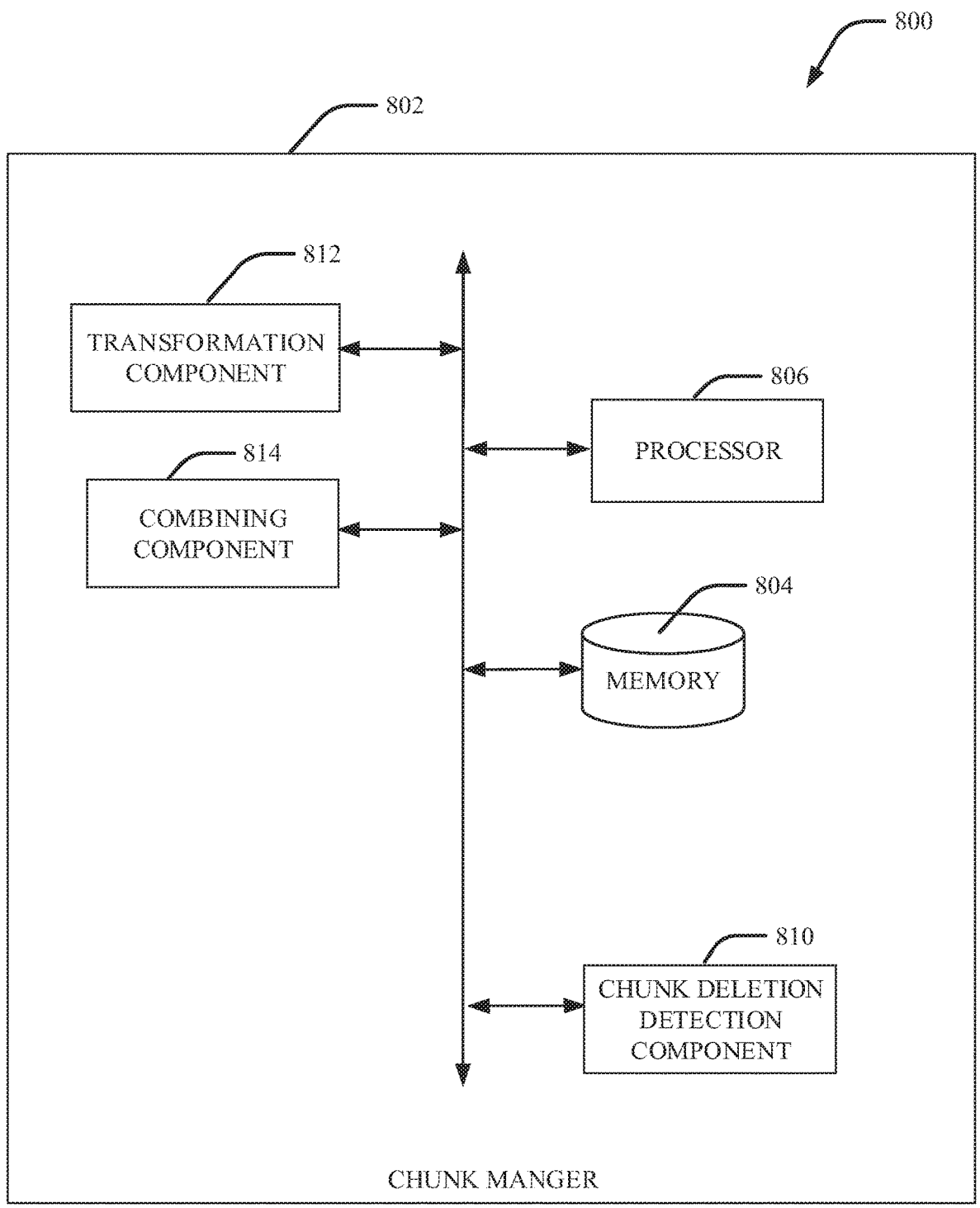
FIG. 8 illustrates an example of a chunk manager operational in a geographically distributed storage system accordance with one or more embodiments described herein.

FIG. 8 illustrates an example of a chunk manager 802 operational in a geographically distributed storage system 800 accordance with one or more embodiments described herein. Repetitive description of like elements employed in respective embodiments is omitted for sake of brevity. In some embodiments, the chunk manager 802 comprises a chunk deletion detection component 810 that detects when a data chunk within geographically distributed storage system 800 has been deleted from a zone (e.g., deletion of data chunk D 352d of zone 4 312d, discussed above). A message, indicating deletion of a data chunk, can be transmitted via wired line or wirelessly to a controller (not shown) that may control functions of each zone. In some embodiments, controller can request an update to the protection set for the coding chunk (e.g., zone 6 312f). In some embodiments, the chunk manager 802 can comprise a transformation component 812 that generates a transformation data chunk (e.g., transformation chunk 352t) using chunk C 352c stored in zone 3 312c. In and embodiment, once the transformation data chunk is generated, the transformation chunk is transmitted to zone 6 352f. In some embodiments, the chunk manager 802 can comprise a combine component 814 that generates an updated coded chunk (e.g., chunk Q' 352f') by combining the chunk Q 352f and the transformation chunk 352t resulting in chunk Q' 352f' having an updated protection set that is different from original data protection set of chunk Q 352f.

Aspects of the processor 806 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described herein. In an aspect, memory 804 can store computer executable components and instructions. It is noted that the memory 804 can comprise volatile memory(s) or nonvolatile memory(s), or can comprise both volatile and nonvolatile memory(s). Examples of suitable types of volatile and non-volatile memory are described below with reference to FIG. 12. The memory (e.g., data stores, databases) of the subject systems and methods is intended to comprise, without being limited to, these and any other suitable types of memory. In some embodiments, the chunk manager 802 can reside in zone and communicatively coupled to one or more of the remaining zones.

Figure 9:
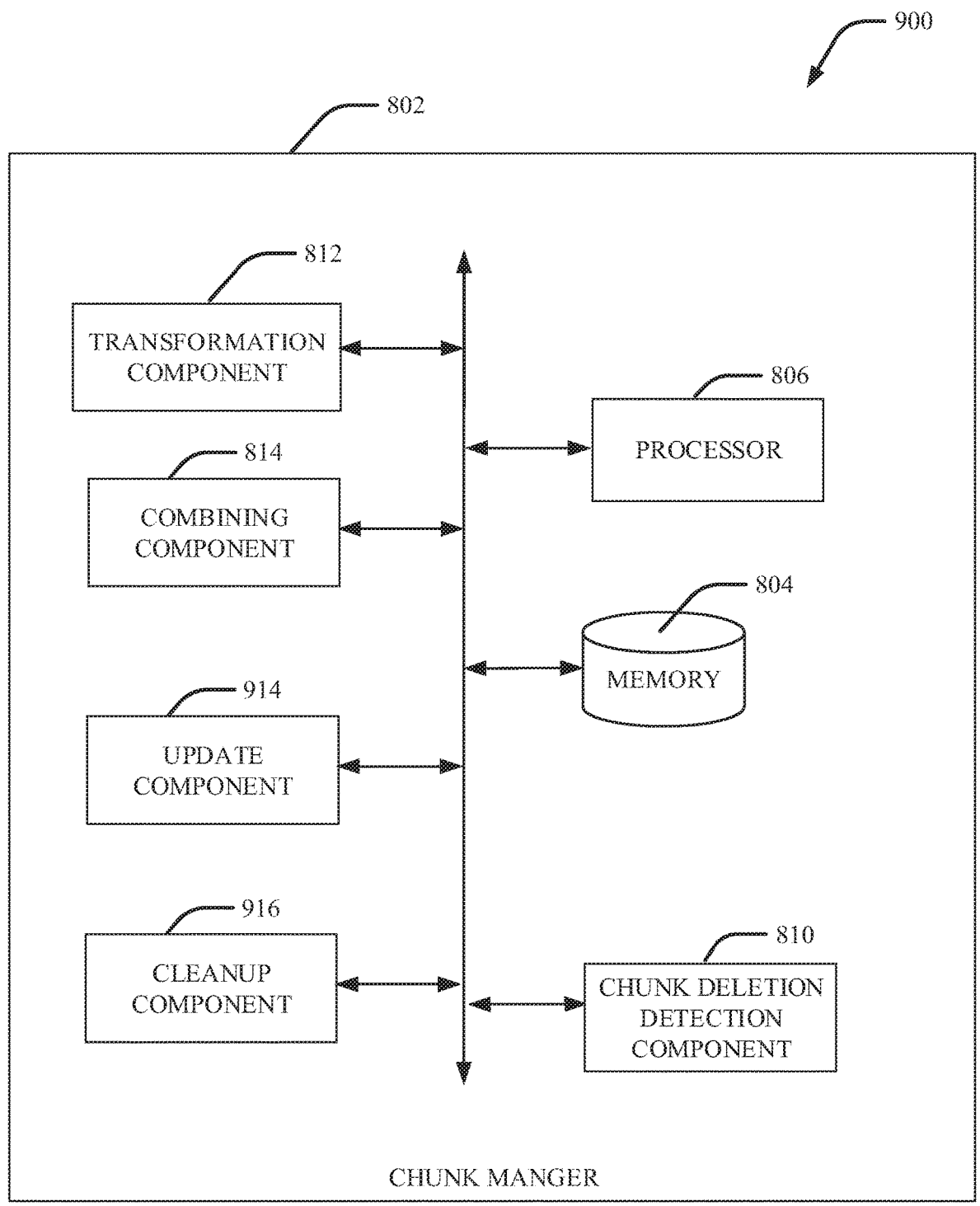
FIG. 9 illustrates an example of a chunk manager operational in a geographically distributed storage system accordance with one or more embodiments described herein.

FIG. 9 illustrates an example of the chunk manager 802 operational in a geographically distributed storage system 900 accordance with one or more embodiments described herein. Repetitive description of like elements employed in respective embodiments is omitted for sake of brevity. In some embodiments, the chunk manager 802 can comprises an update component 914 that updates the degraded coding chunk Q 352f with new coding chunk Q' 352f' having updated data protection set. In some embodiments, the chunk manager 802 can comprise a cleanup component 916 that removes the degraded coding chunk Q352f and the transformation chunk 352t from zone 6 312f.

Figure 10:
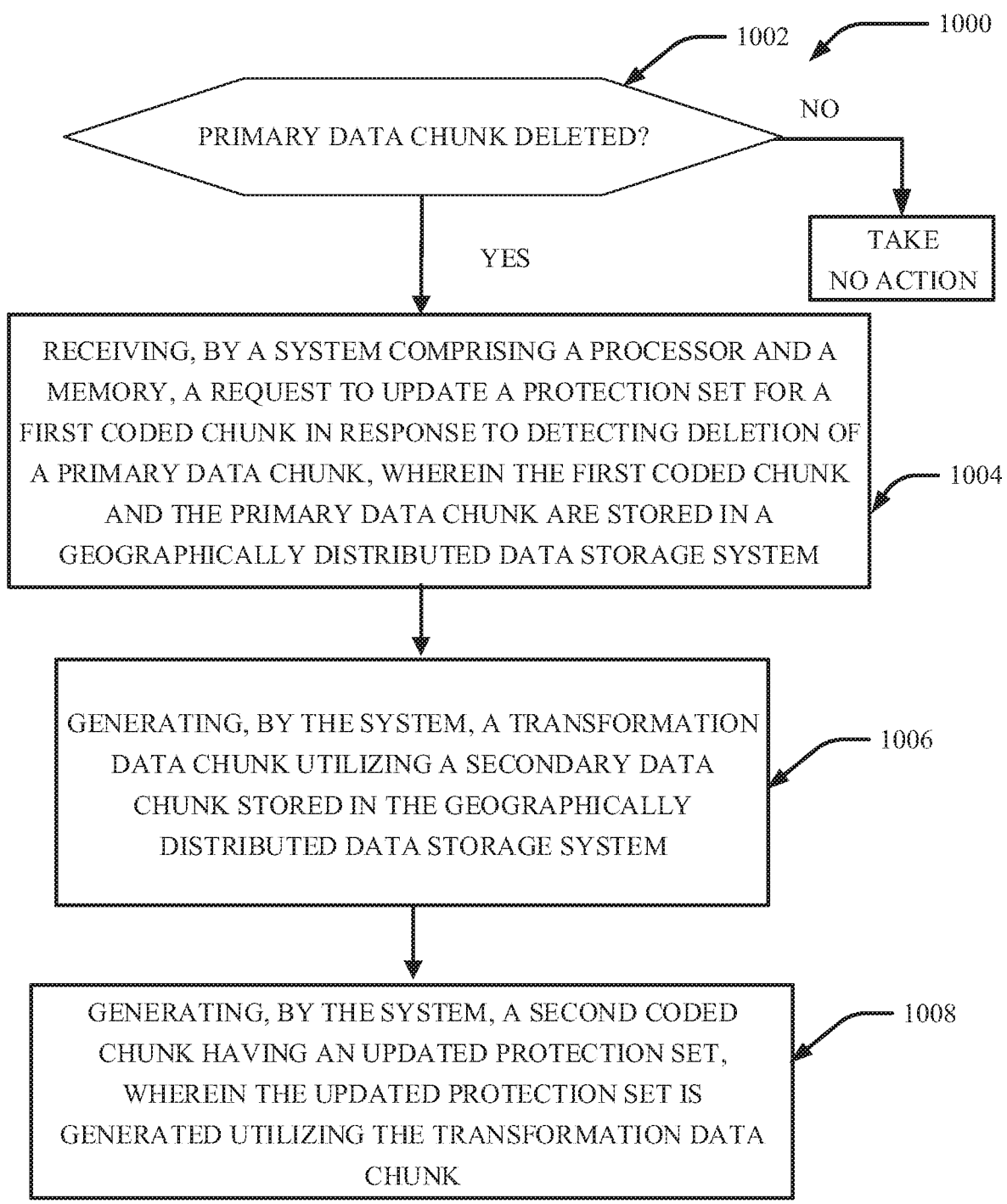
FIG. 10 depicts a diagram of an example, non-limiting computer implemented method that facilitates efficient updating of data protection set in geographically distributed storage system.

FIG. 10 depicts a diagram of an example, non-limiting computer implemented method that facilitates efficient updating of data protection set in geographically distributed storage system. Repetitive description of like elements employed in other embodiments described herein is omitted for sake of brevity. In some examples, flow diagram 1000 can be implemented by operating environment 1200 described below. It can be appreciated that the operations of flow diagram 1000 can be implemented in a different order than is depicted.

In non-limiting example embodiments, a computing device (or system) (e.g., computer 1212) is provided, the device or system comprising one or more processors and one or more memories that stores executable instructions that, when executed by the one or more processors, can facilitate performance of the operations as described herein, including the non-limiting methods as illustrated in the flow diagrams of FIG. 10.

Operation 1002 depicts determining if a primary data chunk was deleted. If a primary data chunk was deleted, then perform operation 1004. Otherwise, continue monitoring. Operation 1004 depicts receiving, by a system comprising a processor and a memory, a request to update a protection set for a first coded chunk in response to detecting deletion of a primary data chunk, wherein the first coded chunk and the primary data chunk are stored in a geographically distributed data storage system. Operation 1006 depicts generating, by the system, a transformation data chunk utilizing a secondary data chunk stored in the geographically distributed data storage system. Operation 1008 depicts generating, by the system, a second coded chunk having an updated protection set, wherein the updated protection set is generated utilizing the transformation data chunk.

Figure 11:
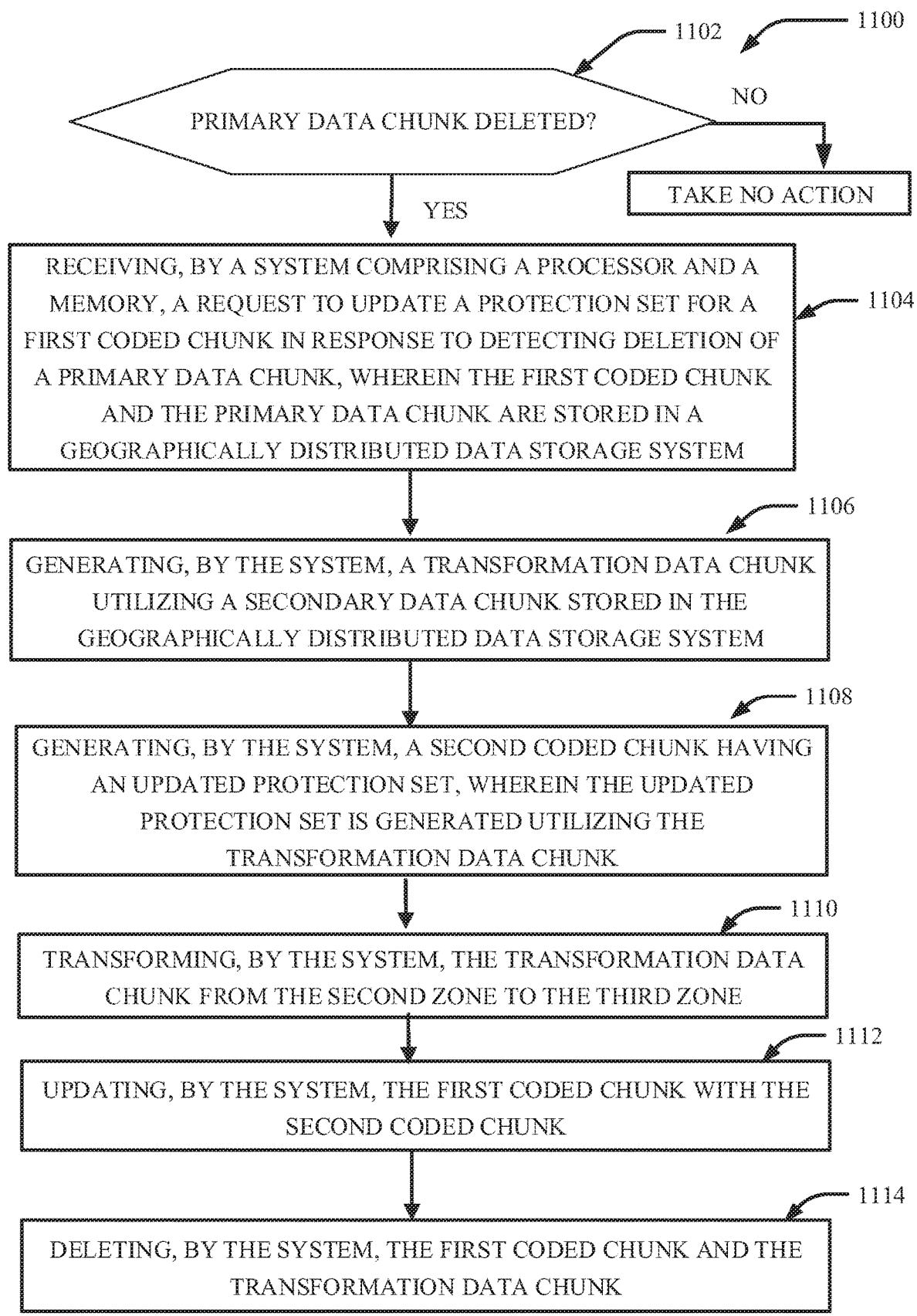
FIG. 11 depicts a diagram of an example, non-limiting computer implemented method that facilitates efficient updating of data protection set in geographically distributed storage system.

FIG. 11 depicts a diagram of an example, non-limiting computer implemented method that facilitates efficient updating of data protection set in geographically distributed storage system. Repetitive description of like elements employed in other embodiments described herein is omitted for sake of brevity. In some examples, flow diagram 1100 can be implemented by operating environment 1200 described below. It can be appreciated that the operations of flow diagram 1100 can be implemented in a different order than is depicted.

In non-limiting example embodiments, a computing device (or system) (e.g., computer 1212) is provided, the device or system comprising one or more processors and one or more memories that stores executable instructions that, when executed by the one or more processors, can facilitate performance of the operations as described herein, including the non-limiting methods as illustrated in the flow diagrams of FIG. 11.

Operation 1102 depicts determining if a primary data chunk was deleted. If a primary data chunk was deleted, then perform operation 1104. Otherwise, continue monitoring. Operation 1104 depicts receiving, by a system comprising a processor and a memory, a request to update a protection set for a first coded chunk in response to detecting deletion of a primary data chunk, wherein the first coded chunk and the primary data chunk are stored in a geographically distributed data storage system. Operation 1106 depicts generating, by the system, a transformation data chunk utilizing a secondary data chunk stored in the geographically distributed data storage system. Operation 1108 depicts generating, by the system, a second coded chunk having an updated protection set, wherein the updated protection set is generated utilizing the transformation data chunk. Operation 1110 depicts transforming, by the system, the transformation data chunk from the second zone to the third zone. Operation 1112 depicts updating, by the system, the first coded chunk with the second coded chunk. Operation 1114 depicts deleting, by the system, the first coded chunk and the transformation data chunk.

Figure 12:
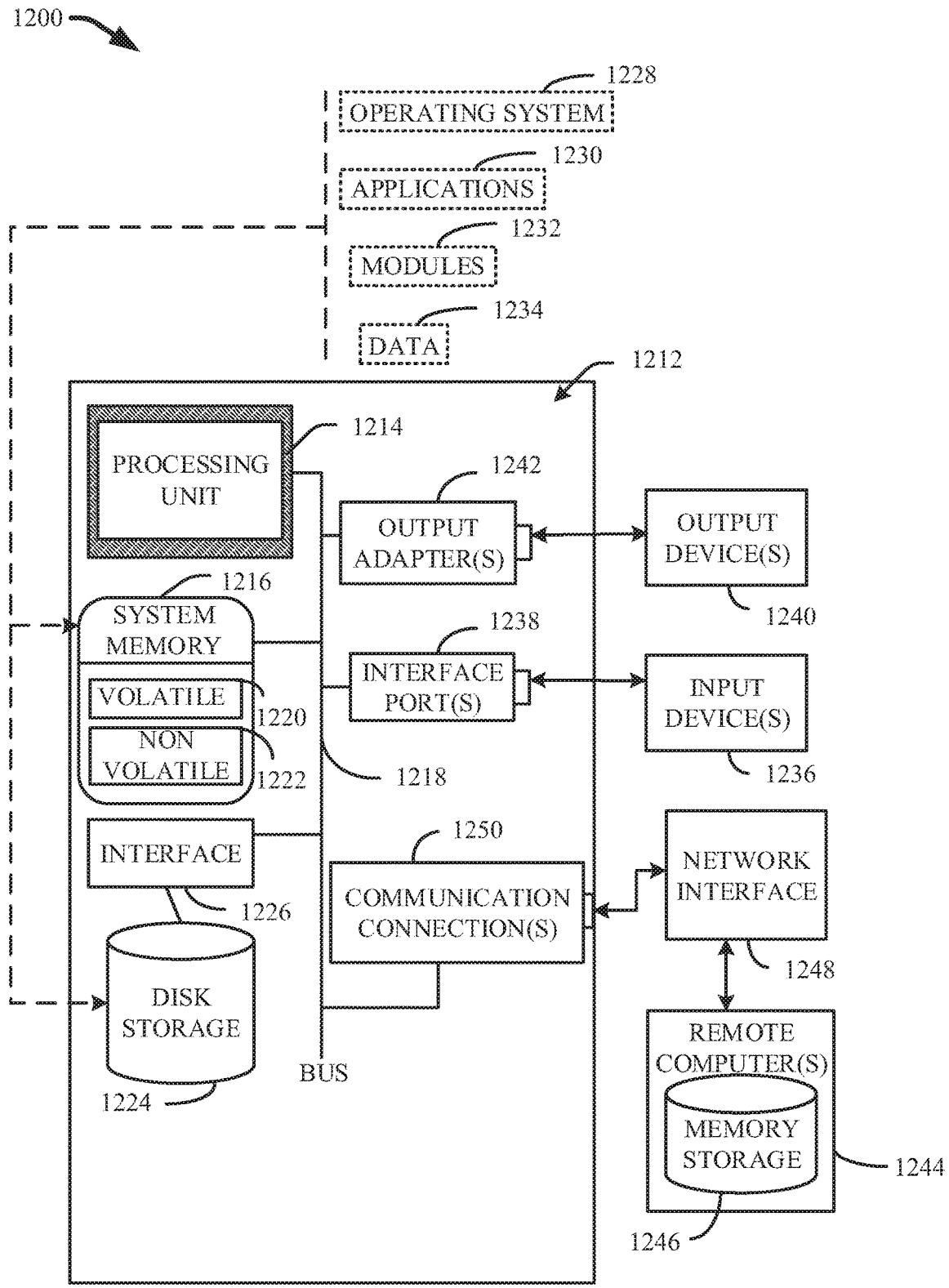
FIG. 12 illustrates a block diagram of an example computer operable to execute updating data protection set in a geographically distributed storage system.

FIG. 12 illustrates a block diagram of an example computer operable to execute updating data protection set in a geographically distributed storage system. In order to provide additional context for various aspects of the disclosed subject matter, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, (e.g., a carrier wave or other transport mechanism), and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference to FIG. 12, a block diagram of a computing system 1200 operable to execute the disclosed systems and methods is illustrated, in accordance with an embodiment. Computer 1212 comprises a processing unit 1214, a system memory 1216, and a system bus 1218. As an example, the component(s), server(s), client(s), node(s), cluster(s), system(s), zone(s), module(s), agent(s), engine(s), manager(s), and/or device(s) disclosed herein with respect to systems 400-900 can each include at least a portion of the computing system 1200. System bus 1218 couples system components comprising, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1216 comprises volatile memory 1220 and nonvolatile memory 1222. A basic input/output system (BIOS), comprising routines to transfer information between elements within computer 1212, such as during start-up, can be stored in nonvolatile memory 1222. By way of illustration, and not limitation, nonvolatile memory 1222 can comprise ROM, PROM, EPROM, EEPROM, or flash memory. Volatile memory 1220 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also comprises removable/non-removable, volatile/non-volatile computer storage media. FIG. 12 illustrates, for example, disk storage 1224. Disk storage 1224 comprises, but is not limited to, devices like a magnetic disk drive, floppy disk drive, tape drive, Jaz drive, Zip drive, LS-100 drive, flash memory card, or memory stick. In addition, disk storage 1224 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

It is to be appreciated that FIG. 12 describes software that acts as an intermediary between users and computer resources described in suitable operating environment 1200. Such software comprises an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be appreciated that the disclosed subject matter can be implemented with various operating systems or combinations of operating systems.

A user can enter commands or information into computer 1212 through input device(s) 1236. Input devices 1236 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1214 through system bus 1218 via interface port(s) 1238. Interface port(s) 1238 comprise, for example, a serial port, a parallel port, a game port, a universal serial bus (USB), a wireless based port, e.g., Wi-Fi, Bluetooth®, etc. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240, like display devices, light projection devices, monitors, speakers, and printers, among other output devices 1240, which use special adapters. Output adapters 1242 comprise, by way of illustration and not limitation, video and sound devices, cards, etc. that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and typically comprises many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically and/or wirelessly connected via communication connection 1250. Network interface 1248 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can comprise, for example, internal and external technologies such as modems, comprising regular telephone grade modems, cable modems and DSL modems, wireless modems, ISDN adapters, and Ethernet cards.

The computer 1212 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1212 can connect to other devices/networks by way of antenna, port, network interface adaptor, wireless access point, modem, and/or the like.

The computer 1212 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth® wireless technologies. Thus, the communication can be a predefined structure as with a conventional network or simply an ad hoc communication between at least two devices.

The computing system 1200 is operable to communicate with any wireless devices or entities operatively disposed in wireless communication, e.g., desktop and/or portable computer, server, communications satellite, etc. This includes at least Wi-Fi and Bluetooth® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic 12BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It is noted that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Furthermore, the terms "user," "consumer," "client," and the like are employed interchangeably throughout the subject specification, unless context warrants particular distinction(s) among the terms. It is noted that such terms can refer to human entities or automated components/devices supported through artificial intelligence (e.g., a capacity to make inference based on complex mathematical formalisms), which can provide simulated vision, sound recognition and so forth.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to dynamically perform operations as described herein.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving a request to update a protection set for a first coded chunk in response to detecting deletion of a primary data chunk, wherein the first coded chunk and the primary data chunk are stored in a geographically distributed data storage system;
generating a transformation data chunk utilizing a secondary data chunk stored in the geographically distributed data storage system; and
generating a second coded chunk having an updated protection set that has been updated from the protection set, wherein the second coded chunk is generated utilizing the transformation data chunk and the first coded chunk.

2. The system of claim 1, wherein the operations further comprise updating the first coded chunk with the second coded chunk.

3. The system of claim 2, wherein the operations further comprise deleting the first coded chunk and the transformation data chunk.

4. The system of claim 1, wherein the generating the second coded chunk comprises using an XOR operation to combine the transformation data chunk and the first coded chunk.

5. The system of claim 1, wherein the first coded chunk comprises a coded version of the primary data chunk, and wherein the first coded chunk is a result of a Geo erasure coding.

6. The system of claim 1, wherein the geographically distributed data storage system utilizes a plurality of zones for storing one or more chunks of data, and wherein the primary data chunk is stored at a first zone, the secondary data chunk is stored at a second zone, and the first coded chunk is stored at a third zone.

7. The system of claim 6, wherein the transformation data chunk is generated at the second zone.

8. The system of claim 7, wherein the operations further comprise:
transforming the transformation data chunk from the second zone to the third zone.

9. The system of claim 1, wherein the geographically distributed data storage system comprises a combined coded chunk generated using an XOR operation.

10. A method, comprising:
receiving, by a system comprising a processor and a memory, a request to update a protection set for a first coded chunk in response to detecting deletion of a primary data chunk, wherein the first coded chunk and the primary data chunk are stored in a geographically distributed data storage system;
generating, by the system, a transformation data chunk utilizing a secondary data chunk stored in the geographically distributed data storage system; and
generating, by the system, a second coded chunk having an updated protection set, wherein the updated protection set is generated utilizing the transformation data chunk.

11. The method of claim 10, further comprising:
updating, by the system, the first coded chunk with the second coded chunk; and
deleting, by the system, the first coded chunk and the transformation data chunk.

12. The method of claim 10, wherein the geographically distributed data storage system utilizes zones for storage of one or more chunks of data, and wherein the primary data chunk is stored at a first zone of the zones, the secondary data chunk is stored at a second zone of the zones, and the first coded chunk is stored at a third zone of the zones.

13. The method of claim 12, wherein the transformation data chunk is generated at the second zone.

14. The method of claim 13, further comprising:
transforming, by the system, the transformation data chunk from the second zone to the third zone; and
updating, by the system, the first coded chunk with the second coded chunk; and
deleting, by the system, the first coded chunk and the transformation data chunk.

15. The method of claim 10, wherein the generating the second coded chunk comprises using an XOR operation to combine the transformation data chunk and the first coded chunk, wherein the first coded chunk comprises a coded version of the primary data chunk, wherein the first coded chunk is result of a Geo erasure coding, and wherein the geographically distributed data storage system comprises a combined coded chunk generated using the XOR operation.

16. A machine-readable non-transitory storage medium, comprising executable instructions that, when executed by a processor, facilitate performance of operations, comprising:
receiving a request to update a protection set for a first coded chunk in response to detecting deletion of a primary data chunk, wherein the first coded chunk and the primary data chunk are stored in a geographically distributed data storage system;
generating a transformation data chunk utilizing a secondary data chunk stored in the geographically distributed data storage system;
generating a second coded chunk having an updated protection set; and
updating the first coded chunk with the second coded chunk.

17. The machine-readable storage medium of claim 16, wherein the updated protection set is generated utilizing the transformation data chunk and from the protection set.

18. The machine-readable storage medium of claim 16, wherein the geographically distributed data storage system utilizes a group of zones to store one or more chunks of data, wherein the primary data chunk is stored at a first zone of the group of zones, the secondary data chunk is stored at a second zone of the group of zones, the first coded chunk is stored at a third zone of the group of zones, and wherein the transformation data chunk is generated at the second zone.

19. The machine-readable storage medium of claim 18, wherein the operations further comprise:
transforming the transformation data chunk from the second zone to the third zone; and
deleting the first coded chunk and the transformation data chunk.

20. The machine-readable storage medium of claim 16, wherein the generating the second coded chunk comprises using an XOR operation to combine the transformation data chunk and the first coded chunk, wherein the first coded chunk comprises a coded version of the primary data chunk, wherein the first coded chunk is result of a Geo erasure coding, and wherein the geographically distributed data storage system comprises a combined coded chunk generated using the XOR operation.

* * * * *